Dec. 27, 1966    C. T. WALTER    3,294,215
ARTICLE ACCELERATOR OF VARIABLE PITCH CHAIN TYPE
Filed April 14, 1965    3 Sheets-Sheet 1
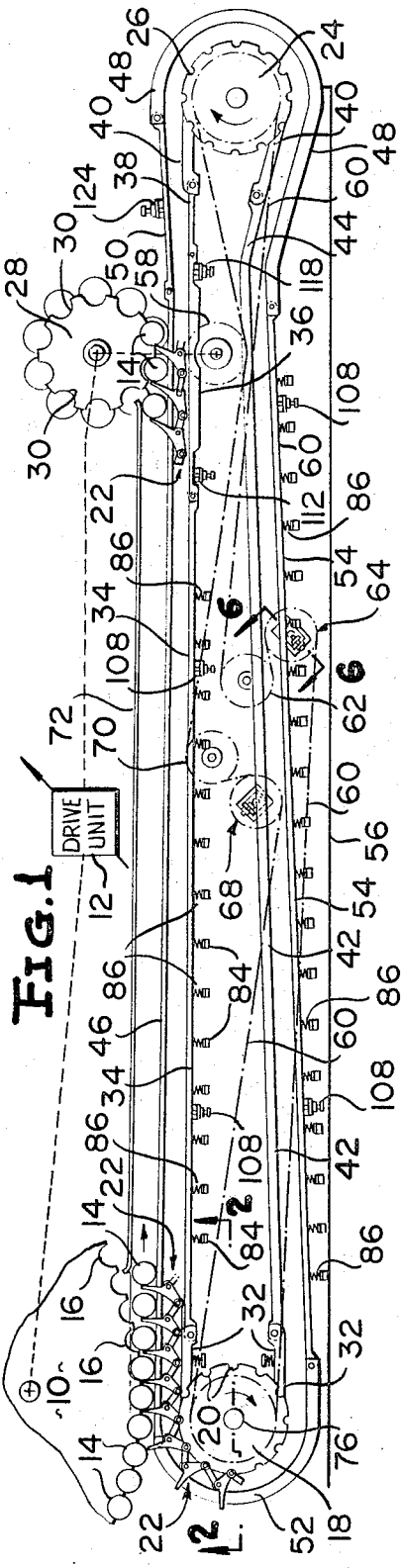
INVENTOR
CHARLES T. WALTER
BY
Mason, Porter, Diller & Brown
ATTORNEYS

INVENTOR
CHARLES T. WALTER

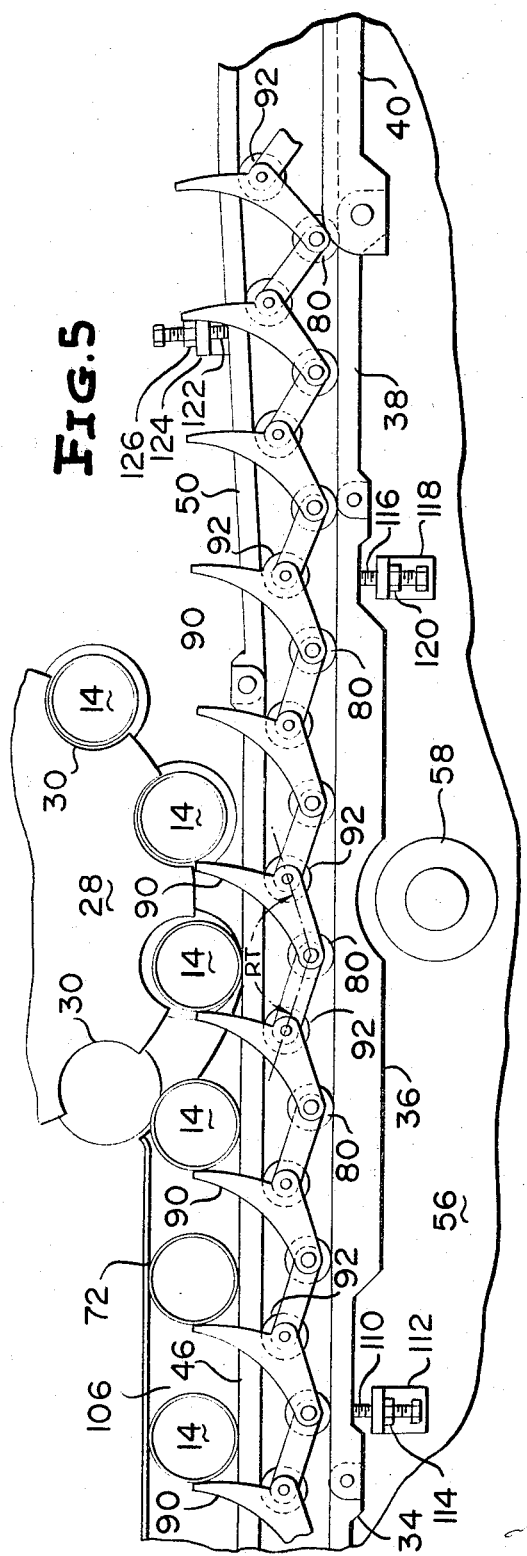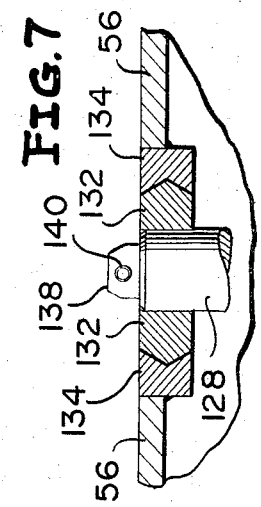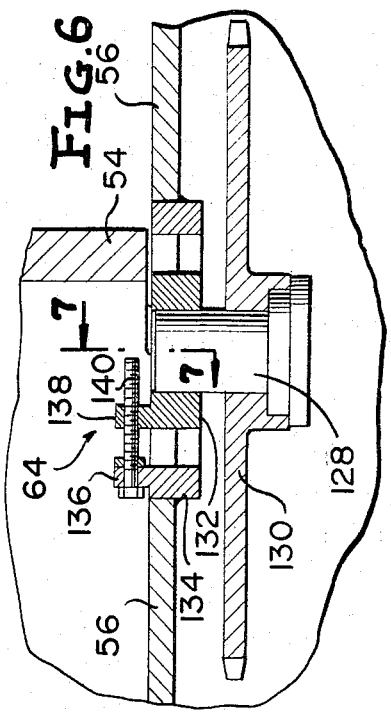

United States Patent Office 3,294,215
Patented Dec. 27, 1966

3,294,215
ARTICLE ACCELERATOR OF VARIABLE
PITCH CHAIN TYPE
Charles T. Walter, Lemont, Ill., assignor to Continental
Can Company, Inc., New York, N.Y., a corporation
of New York
Filed Apr. 14, 1965, Ser. No. 448,008
17 Claims. (Cl. 198—110)

This invention relates to an apparatus and method for accelerating articles between two stations and more specifically to an article accelerator wherein a conveyor chain having article engaging dogs positioned thereon uniformly accelerates the articles between the stations.

In many manufacturing processes, articles pass from station to station so that a step in the process may be performed at each of the stations. Since each of the drive units operating a particular station may operate at a different speed than the other stations along the line, it becomes necessary to maintain synchronism of the system by accelerating either positively or negatively, the articles as they pass between stations. In many such operations, the acceleration between stations must be uniform, otherwise the article may be damaged, upset, or spilling of the contents of the article may take place. For example, in the filling of beverage containers and the subsequent application of an end to the open container, the filling turret may deliver the filled containers to a conveyor wherein the spacing of the containers is not in agreement or synchronism with the spacing of a removal turret, which removal turret may apply and secure the final end to the container.

The present practice employs a series of endless chain conveyors having article advancing dogs positioned thereon. The chain conveyors are arranged in tandem order and the speed of each successive conveyor is increased, or decreased as required, from the delivery station to the removal station. As the article passes from conveyor to conveyor, it is abruptly accelerated during the transfer. The primary deficiency of this arrangement is that during very high speed operation, the articles are jolted as they are engaged by the successive feed dogs of the conveyors. This jolting may cause the spilling of a portion of the contents of the container or article and in addition, may cause damage to the article. Also, the article may upset, thus not only damaging the article but also causing damage to the conveyors or other equipment.

Accordingly, it becomes desirable to provide a means whereby the conveyor between stations would uniformly accelerate the article so that the spacing of the articles as delivered to the conveyor could be changed so as to compensate for the different spacing of the articles required at the removal station. In this manner, the uniform acceleration of the conveyor would diminish or even eliminate the spilling of the contents of the article as well as reduce the possibility of damage to the articles or the conveying system.

Accordingly, it is the principal object of the present invention to improve article conveyors by providing a system having uniform acceleration between work stations.

It is a further object of the present invention to improve article conveyors of the type wherein the receipt and delivery of the articles by asynchronous means may be accommodated.

It is a further object of the present invention to provide an apparatus and method for receiving a continuous stream of articles having a spacing between articles which is different from the spacing at which the articles must be removed.

It is a further object of the present invention to provide an apparatus for receiving a continuous stream of articles from a first turret, which may be a container filling turret, at a first spacing between the articles, and advancing the articles to a second turret, which may be an end closing turret, at a second spacing between the articles, the change in spacing being accomplished by a conveyor between the turrets having means for changing the acceleration of the articles.

It is a further object of the present invention to provide an apparatus for receiving a continuous supply of articles from a first turret, which may be a container filling turret, at a first spacing between the articles, and advancing the articles to a second turret, which may be an end closing turret, at a second spacing between the articles, the change in spacing being accomplished by a chain conveyor between the turrets which bears extending article engaging fingers whose position with respect to the chain may be varied so as to accommodate the transfer of articles from turrets having provisions for different article spacing.

It is a further object of the present invention to provide an article conveyor which has extending article engaging fingers supported by a chain whose linear length may be varied to thereby vary the angle at which the fingers extend from the chain, which results in an acceleration of the article engaged by the article engaging fingers.

It is a still further object of the present invention to provide an article conveyor for supplying constant acceleration to articles being transported thereby which is comprised of a plurality of individual units, each of the units having a pair of rollers bearing on converging guide walls and supporting an extending article engaging finger whose relative position with respect to the conveyor path is varied as the article advances to thereby impart uniform acceleration to the articles.

It is a still further object of the present invention to provide an apparatus for uniformly accelerating articles between a first turret and a second turret through engagement with a conveyor chain wherein the synchronism between the first turret and the chain and between the second turret and the chain may be independently varied.

These and other objects of the present invention are accomplished by providing a conveyor chain which is supported about a pair of sprockets in spatial relationship and wherein the conveyor chain has a run between a delivery turret and a removal turret. The spacing of the articles delivered to the conveyor chain by the delivery turret is different from the spacing required to match the receiving slots of the removal turret. Accordingly, if the transfer operation accomplished by the conveyor chain between the two turrets is to be successful, then the spacing of the article must be varied as the articles are advanced by the conveyor chain between the turrets.

The spacing is changed by uniformly accelerating the articles during their engagement with article engaging fingers positioned upon and forming part of the conveyor chain. The conveyor chain is continuous and formed of a plurality of individual units. Each unit includes a pair of rollers having a bottom connecting link and an upper connecting link which is extended so as to form both a connecting link and an article engaging finger. A pair of links then connect each of the units together to form the continuous conveyor chain.

The rollers of each unit are confined within a channel formed of a pair of vertical walls or guides. The guides converge in the direction toward which it is desired to increase the spacing between the articles. As the conveyor chain including the rollers advances along the guides, one of the rollers will pivot with respect to the other roller of each unit and thereby carry the article engaging finger to a more forward position. As a result, assuming that the converging guides or walls of the channel are converging at a uniform rate, the acceleration of the articles engaged by the article engaging fingers will be uniform throughout the travel until such time as the articles are removed or the rollers of the article conveying run become substantially in-line.

In addition to the foregoing apparatus and its operation, means are provided for independently altering or adjusting the synchronism between the delivery turret and the article engaging fingers as well as the synchronism between the receiving turret and the article engaging fingers, without disturbing the synchronism of one during the adjusting of the other. Also, means are provided for adjusting or altering the amount of convergence of the side rails of the channel so as to change the acceleration of the articles to a different value. Also, provision is made for adjusting the pitch of the fingers, adjusting the chain for wear, and lubricating the conveyor chain.

By the foregoing, the uniform acceleration imparted to the articles as they pass from one station to a second station, greatly simplifies the operation as well as reducing spillage of the articles in the event that the articles are containers of viscous liquids.

The invention both as its organization and method of operation together with further objects and advantages thereof will best be understood by reference to the following specification taken in conjunction with the accompanying drawings in which:

FIGURE 1 is a plan view of the invention showing a delivery turret, the article and conveyor chain paths, and the receiving or discharge turret;

FIGURE 2 is a sectional view taken along the line 2—2 of the FIGURE 1 and showing the details of one of the conveyor chain sprockets, the drive sprockets, and the details of the conveyor chain;

FIGURE 5 is an enlarged plan view of the discharge end of the apparatus;

FIGURE 6 is a sectional view taken along the line 6—6 of the FIGURE 1 and illustrating the conveyor chain take-up mechanism for compensating for chain wear; and FIGURE 7 is a sectional view taken along the line 7—7 of the FIGURE 6 and further illustrating the take-up mechanism.

Figure 3:
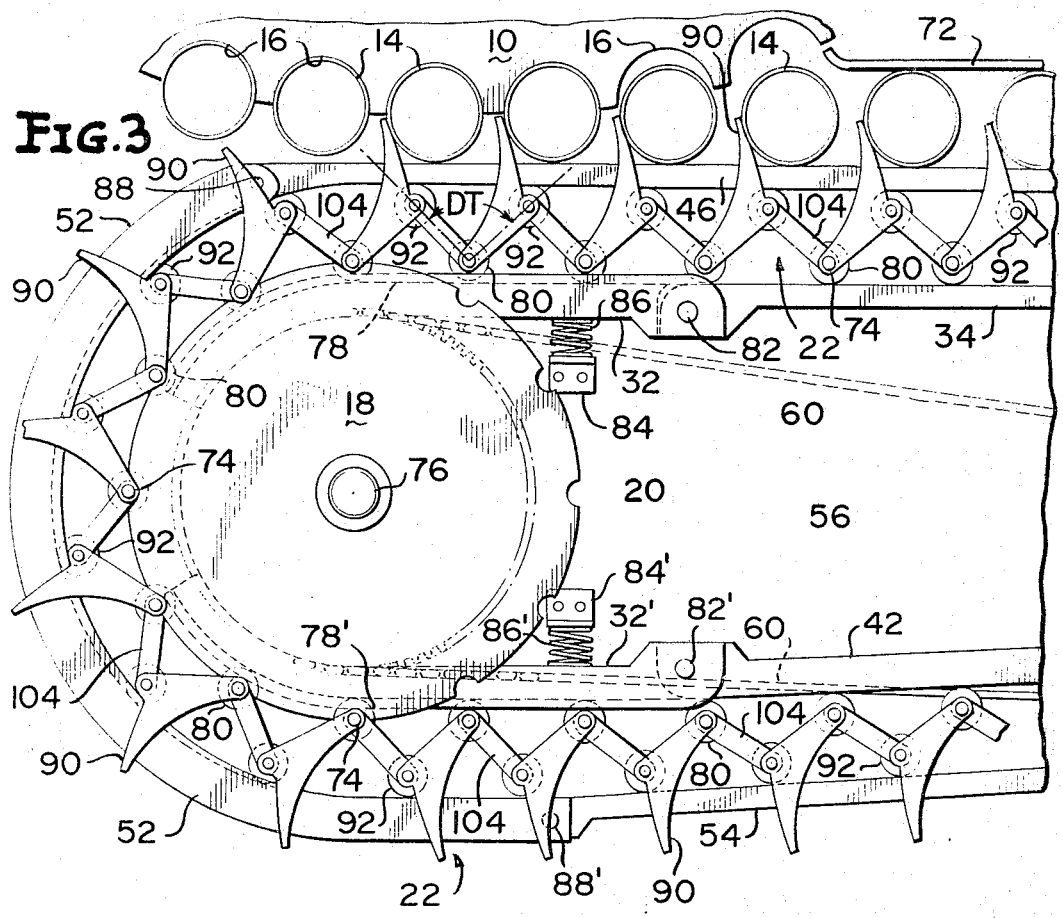
FIGURE 3 is an enlarged plan view of the delivery end of the system.

With reference to the FIGURE 1, a delivery turret 10 is supplied rotational movement through its coupling with a variable drive unit 12 and supports a plurality of articles, such as the containers 14 in a plurality of equally spaced peripheral notches 16. In juxtaposition to the delivery turret 10 is an upper conveyor chain sprocket 18 which bears about its periphery a plurality of equally spaced notches 20 for engaging a conveyor chain 22. The conveyor chain 22 and the remaining elements in the area of the delivery turret 10 and the upper conveyor chain sprocket 18 will be discussed in detail with reference to later figures.

With continued reference to the FIGURE 1, a second conveyor chain sprocket 24 is positioned in spatial relationship to the conveyor chain sprocket 18 and, as shown, embodies a plurality of similar notches 26 about its periphery for engaging the conveyor chain 22. Along the conveyor chain 22 path, intermediate the sprockets 18 and 24 and at the end of the article path is positioned a receiving or discharge turret 28. The receiving turret 28 is coupled for rotational movement by the variable drive unit 12 and, similar to the delivery turret 10, embodies a plurality of peripheral notches 30 for receiving the articles from the article path. It will be noted that the spacing of the articles about the delivery turret 10 is different from the spacing of the articles about the receiving turret 28. For this reason, the conveyor chain 22 cooperates with a channel having a pair of side walls, to be hereinafter described, to permit the articles 14 to be delivered to the notches 30 of the receiving turret 28 without damage. Further, since the article capacity of the receiving turret 28 is less than the article capacity of the delivery turret 10, it will be understood that the rotational velocity of the receiving turret 28 will be greater than that of the delivery turret 10.

The conveyor chain 22 is confined to a predetermined path which will now be described. As the chain 22 advances about the conveyor chain sprocket 18 it is confined within a circular grooved guide 32 which cooperates with an adjustable inside rail or guide 34 whose opposite end is connected to a short guide 36. The end of the circular grooved guide 32, the guide 34 and the guide 36 are substantially in-line. The guide 36 is connected to an intermediate guide 38 which guide 38 is coupled to an inside circular guide 40 which surrounds the second conveyor chain sprocket 24. The circular guide 40 then couples with the circular grooved guide 32 by a substantially straight rail or guide 42 except for the bend at 44.

In the FIGURE 1, an outside rail or guide follows the general path of the inside guides but in spatial relationship thereto. More specifically, a guide 46 is positioned away from the guide 34 so as to cooperate with the guide 34 and form the run of the conveyor chain wherein the articles are advanced and accelerated. An outer circular guide 48 surrounds the conveyor chain sprocket 24 and is joined to the guide 46 by a short section of guide 50. The outer circular guide 48 follows the general contours of the inner guide and is connected to an outer circular guide 52 which surrounds the conveyor chain sprocket 18 by an adjustable guide 54. The foregoing elements are positioned upon a base member 56 and supported thereby.

The conveyor chain sprockets 18 and 24 are provided rotational movement from the variable speed drive unit 12 to a sprocket 58 shown in the FIGURE 1 directly below the receiving turret 28. The sprocket 58 engages a continuous driving chain 60 which will be discussed in greater detail with reference to later figures. However, the driving chain 60 advances from the sprocket 58 about a sprocket (not shown) which is below the conveyor chain sprocket 24, and to a sprocket 62 supported by and below the base member 56. The direction of movement of the chain 60 is reversed by the sprocket 62 and it then passes about a sprocket of an adjustable sprocket assembly 64, which is also mounted below and supported by the base member 56. The adjustable sprocket assembly 64 again reverses the direction of motion of the chain 60 so that the chain 60 is now moving in the general direction of the conveyor chain sprocket 18. The adjustable sprocket assembly 64 has a special function in the apparatus and that is to maintain a predetermined tension on the driving chain 60 at all times and to compensate for chain wear.

The driving chain 60 of the FIGURE 1 then continues and forms a path about a sprocket 66 (FIGURE 2) for advancing the upper conveyor chain sprocket 18 in the direction shown. The chain 60 then advances around a sprocket of an adjustable sprocket assembly 68 and about a second sprocket 70 and then to the driving sprocket 58. Thus the path of the driving chain 60 has been completed. The adjustable sprocket assembly 68 has a special function and that is to not only compensate for chain wear but also to adjust the synchronism or timing between the conveyor chain 22 and the delivery turret 10. This adjustment may be performed while the system is operating and without disturbing the the synchronism or timing between the conveyor chain 22 and the receiving turret 28.

In the FIGURE 1, it will be noted that the adjustable guide 34 and the fixed guide 46 converge toward the receiving turret 28 which causes a lengthening of the conveyor chain 22 in that area. The lengthening of the conveyor chain 22 provides the constant acceleration of the articles from the delivery turret 10 to the receiving turret 28 since the article engaging fingers (to be hereinafter described) pivot as the conveyor chain 22 is lengthened and thereby provide constant acceleration to the articles 14. The articles 14 are confined to a path as shown in the FIGURE 1 which path is formed by the opposite side of the guide 46 which is in engagement with the conveyor chain 22 and by a guide 72 which is substantially parallel to the guide 46 and spaced a distance therefrom slightly in excess of the diameter of the articles 14.

The details of the apparatus in the area of the delivery turret 10 and the receiving turret 28 are shown at a larger scale in the FIGURES 3 and 5, respectively. Accordingly, reference will now be made to the plan view of the FIGURE 3 for a more detailed description of the apparatus in this area and subsequently, to the FIGURES 2 and 4 which are elevation views in the deliver turret 10 area. The elements of the conveyor apparatus are mounted upon the base member 56. The upper conveyor chain sprocket 18 bears the notches 20 about its periphery for engaging and mating with the rollers 74 of the conveyor chain 22. In this manner, a positive drive is supplied to the conveyor chain sprocket 18 is connected to a shaft 76 by any suitable means. Immediately below and under, as viewed in the FIGURE 3, the upper conveyor chain sprocket 18 is the guide 32 which is of two sections, the section 32' in the area of the sprocket 18 where the chain approaches the assembly and a section 32 in the area where the conveyor chain 22 leaves the assembly. Each of the guide 32 and 32' are grooved at 78 and 78', respectively, in order to receive an inside roller 80 of the conveyor chain 22.

The circular grooved guide 32 is pinned to the guide 34 by a pin 82 and its position is adjustable by a bracket 84 to which a spring 86 is affixed thereto and in engagement with the circular grooved guide 32. The bracket 84 is secured to the base member 56 by any suitable means. Similarly, the circular grooved guide 32' is secured to the inner guide section 42 by a pin 82'. Also, a bracket 84' and spring 86' provide for adjustment of the position of the circular grooved guide 32'. The outer circular guide 52 surrounds approximately one-half of the circumference of the rotating assembly shown in the FIGURE 3 and is pinned to the guide 46 by the pin 88 and to the adjustable guide 54 by the pin 88'.

As shown in the FIGURE 3, an extending article engaging finger 90 of somewhat triangular shape but having a concave hypotenuse, joins the inside roller 80 of the conveyor chain 22 to an outside roller 92 and extends beyond the outer guides 54, 52, and 46 so as to assist in the removal of the containers 14 from the notches 16 of the delivery turret 10. Since the conveyor chain 22 is driven in synchronism with the arrival of the articles or containers 14 by the delivery turret 10, the containers 14 are gently removed from their respective notches 16 and commence moving along the path formed by the guide 46 and the guide 72.

Figure 4:
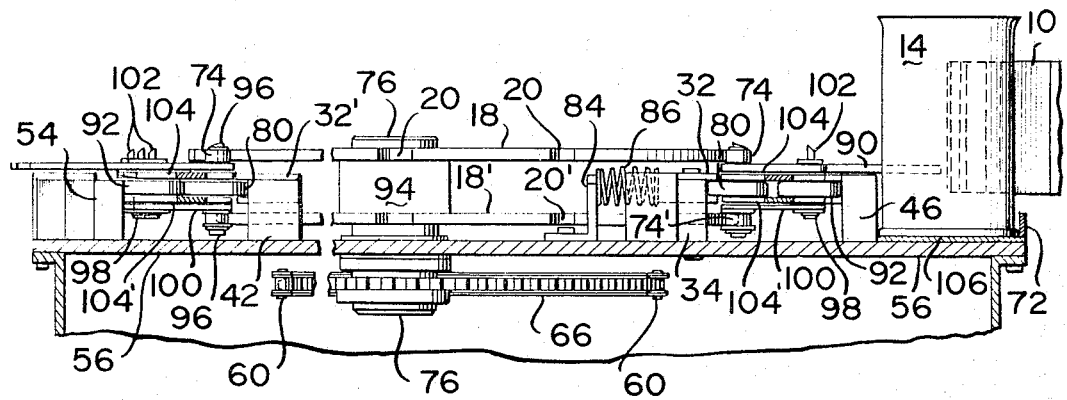
FIGURE 4 is a sectional view taken along the line 4—4 of the FIGURE 2 and showing further details of the sprockets, the conveyor chain, the article paths, and the article engaging finger.

The details of the conveyor chain 22 will be discussed with reference to the FIGURE 2, which is a sectional view taken along the lines 2—2 of the FIGURE 1 and the FIGURE 4, which is a sectional view taken along the line 4—4 of the FIGURE 2. The sectional view of the FIGURE 4 is taken at substantially 90 degrees to the elevational sectional view of the FIGURE 2. The upper conveyor chain sprocket 18 is supported above an identical lower conveyor chain sprocket 18' upon the shaft 76 and maintained in position by a spacer 94. The sprockets 18 and 18' are secured to the shaft 76 and are driven by the chain sprocket 66 which is secured to the shaft 76 below the base member 56. The inside roller 80 of the conveyor chain 22 is positioned within a groove in the circular grooved guide 32, as shown. Similarly, the outside roller 92 is positioned within and in rolling contact with the groove in the outer circular guide 52. In general, the rollers 80 and 92 are advanced in grooved guides only in the areas about the conveyor chain sprockets 18 and 24. In the runs between these sprockets, the rollers advance along the flat surfaces of their respective guides.

The conveyor chain 22 is comprised of a number of identical elements which include the rollers 80 and 92, the article engaging fingers 90, an upper roller 74 which engages, in the FIGURES 2 and 4, the upper conveyor chain sprocket 18 and a substantially similar lower roller 74' which engages a notch in the lower conveyor chain sprocket 18'. In addition, each of the elements includes three links and a pair of shafts which will now be described. A first shaft 96 supports the rollers 74 and 74' and may contain at its upper end, a small aperture for receiving lubricant. The rollers 74 and 74' are secured to the shaft 96 in any suitable manner. The second shaft is identified as 98 and supports the roller 92 as well as the article engaging finger 90. A link 100 connects the shafts 96 and 98 together so that the shafts 96 and 98 are supported at their lower ends by the link 100 and at their upper ends by the article engaging finger 90. The upper end of the shaft 98 may contain a small aperture 102 for receiving lubricant. A pair of links 104 and 104' are employed to secure each of the elements of the chain together so as to form a continuous conveyor chain 22. The upper link 104 is shown in plan view in the FIGURE 3 and in elevation view in the FIGURES 2 and 4. The links 104 and 104' in the FIGURES 2 and 4 are immediately behind similar links 104 and 104' so that the cross-sectional showing is of the links joining the element in front of the element to the rear and joined by the links 104 and 104'.

In the FIGURE 4, a container 14 is shown supported between the guides 46 and 72 and upon a friction reducing flat member 106 which is positioned between the base member 56 and the container 14 so as to reduce the frictional engagement of the containers 14 and thereby allow the containers 14 to slide along the pathway with little resistance to motion.

With reference again to the FIGURE 1, the position of the movable guide 34 along the article advancing run of the conveyor and the movable guide 54 along the return run of the conveyor, are maintained in position by a plurality of springs 86 which are secured at an end to the brackets 84 which are secured to the base member 56 in any suitable manner. The extent of movement of the guides 34 and 54 is limited by a plurality of back-up screws 108 of which two are shown in engagement with the guide 34 and two in engagement with the guide 54. The back-up screws include a threaded member which is in engagement with its respective guide and a small bracket through which the threaded member passes and is secured to the base member 56 in any suitable manner. Adjustment of the back-up screws 108 along the guide 34 determines the acceleration imparted to the articles 14 as they pass from the delivery turret 10 to the receiving turret 28. If the guides 34 and 46 are very close together in the area juxtaposed the receiving turret 28, then the acceleration imparted to the containers 14 is greater than if the guides 34 and 46 are farther apart at their ends near the receiving turret 28. If the guides 34 and 46 are substantially parallel between the turrets 10 and 28, then the acceleration of the articles would be substantially zero. However, in the embodiment shown in the FIGURE 1, some acceleration must be imparted to the articles 14 since the spacing of the delivery turret 10 is different from the spacing of the receiving turret 28.

The FIGURE 5 is an enlarged plan view of the area adjacent the receiving turret 28. The containers 14 are being advanced along the container path which includes the guides 46 and 72 and the bottom member 106. Each of the containers 14 are being urged along the container path by an article engaging finger 90 which projects beyond the guide 46 and into the area occupied by the containers 14 in the path.

By varying the position of the guide rails for the conveyor chain 22, the relative position of the projecting article engaging fingers 90 are altered. That is, if the guides 36 and 46 in the FIGURE 5 are moved closer together, the conveyor chain 22 is elongated thus advancing the article engaging end of the article engaging fingers 90 to the right. Similarly, if the distance between the guides 36 and 46 is increased, the upper end of the fingers 90 will pivot to the left. In order to accomplish the adjustment of the guide 36, a plurality of back-up screws similar to the screws 108 are provided, as shown. A screw 110 engages the guide 36 in the area to the left of the receiving turret 28. A bracket 112 is secured to the base member 56 and through the assistance of a nut 114 upon the screw 110, the left end of the rail or guide 36 is maintained in the desired position. Similarly, a screw 116 threaded to a bracket 118 and supporting a nut 120 is employed to maintain the right end of the guide 36 in the desired position. The advancement or the retardation of the screw 110 mounted upon the bracket 112 is employed in the invention as a fine pitch adjustment for the article engaging fingers 90. In this manner, precise synchronism of the arrival of a container 14 at the receiving turret 28 may be maintained. The guide 36 is secured at its left end to the guide 34 and at its right end to the guide 38, by the pins as shown.

The synchronism or timing between the receiving turret 28 and the conveyor chain 22 bearing the article engaging fingers 90 may also be adjusted by a screw 122 which engages the guide 50 and is secured to the base member 56 by a bracket 124. A nut 126 is threaded upon the screw 122 so as to provide a means for locking the screw 122 in the desired position. By advancing the screw 122 in the direction so as to narrow the distance between the guides 38 and 50, the ends of the article engaging fingers 90 which engage the containers 14, are advanced to the right and by turning the screw 122 in the direction to increase the distance between the guides 38 and 50, the ends of the article engaging fingers 90 which engage the containers 14 are moved leftwardly. Accordingly, the adjustment of the position of the guides in the system provides a means for altering the synchronism of the turrets with the conveyor chains and thereby provide a means for compensating for chain wear, turret wear, etc. The foregoing adjustments may be made wile the machine is in operation and also independently of any other adjustments, i.e., the synchronism between the receiving turret 28 and the conveyor chain 22 may be varied without disturbing the synchronism between the delivery turret 10 and the conveyor chain 22.

As shown in the FIGURE 1, the adjustable sprocket assembly 68 provides a means for altering the timing or synchronism between the delivery turret 10 and the conveyor chain 22. Advancement of the sprocket assembly 68 so as to increase the tension on the chain in the run between the sprocket assembly 68 and the sprocket 66 (FIGURE 2) will advance the chain and thereby provide a synchronizing mechanism. The adjustable sprocket assembly 68 of the FIGURE 1 is similar to the adjustable sprocket assembly 64 of the same figure which will hereinafter be described with reference to the FIGURES 6 and 7.

In the FIGURES 6 and 7, a stub shaft 128 supports a sprocket 130 rotatably mounted thereon which is in running engagement with the driving chain 60. The shaft 128 is fixedly mounted by any suitable means to a beveled block 132 which is slidable in ways 134. The ways 134 are secured in any suitable manner to the base member 56. A projection 136 from a connecting end portion of the ways 134 is threaded and in alignment with a projection 138 on the beveled block 132. A threaded bolt 140 extends through the projections 132 and 138 and since the projection 136 is in a fixed position, rotation of the threaded bolt 140 will move the beveled block 132 to the right or to the left, as shown in the FIGURE 6. This movement carries the stub shaft 128 along with it and in this manner, will increase or decrease the tension in the driving chain 60 which surrounds a portion of the sprocket 130 so as to advance or retard the elements of the conveyor chain 22, as best shown in the FIGURE 3. In this manner, synchronism between the delivery turret 10 and the conveyor chain 22 may be adjusted or maintained so as to provide for wear, different sized articles, etc. The foregoing adjustment may be made independently without varying other parameters of the system.

The description of operation will now be set forth with reference to the FIGURES 1, 3 and 5. Since the number of articles, such as the containers 14, delivered to the conveyor must equal the number of articles removed, initial determinations would involve the number of article relationship between the delivery turret 10 and the receiving turret 28. For example, if the delivery turret has positions for 50 articles about its periphery and the receiving turret has positions for 10 articles about its periphery, then the revolutions per minute relationship between the turrets 10 and 28 would be 1 to 5, i.e., for each revolution of the delivery turret 10, the receiving turret would make five revolutions.

Further initial considerations relate to the acceleration to be imparted to the articles as they are advanced by the conveyor chain 22. Knowing the spacing at which the containers 14 are delivered to the system and the spacing necessary for entry to and removal by the delivery turret 28, experimentation will reveal the proper positions of the guides 34 and 46 with respect to each other. It is noted that the position of the guide 34 may be adjusted by the back-up screws 108 positioned along and being in engagement with the guide 34 and anchored to the base member 56. While the position of the guide 34 provides a coarse adjustment of the acceleration imparted to the containers 14 during their travel, the short section of guide 36 positioned adjacent the receiving turret 28 provides a fine adjustment of the pitch of the article engaging fingers 90 of the conveyor chain 22 with the point of delivery to the receiving turret 28. The position of the guide 36 may be altered by rotation of the screws 110 and 116, best shown in the FIGURE 5.

The system is now ready for operation. Accordingly, the variable drive unit 12 is actuated so that rotational motion is applied to the delivery turret 10, the receiving turret 28, and the sprocket 58 which advances the driving chain 60 and, through causing rotation of the sprockets 18 and 24, advances the conveyor chain 22 of the FIGURE 1 from left to right.

In order to understand how acceleration is imparted to the articles 14 as they are advanced by the conveyor chain 22, we will consider the angle between a first line drawn through an inside roller 80 and an adjacent ouside roller 92 and a second line through the same inside roller 80 and the other adjacent ouside roller 92, at the delivery point (FIGURE 3) and the angle made between these same elements at the removal or receiving point (FIGURE 5). As shown in the FIGURE 3, the foregoing described angle has been drawn through the roller set forth and forms an angle identified as DT. It will be noted that this angle is approximately 90 degrees. As the conveyor chain 22 advances along the path formed by the guides 34 and 46, the conveyor chain is "compressed" and becomes elongated due to the convergence of the guides 34 and 46 so that the angle between the identical elements set forth now becomes, as shown in the FIGURE 5, the angle RT which is approximately 145 degrees in the example set forth. As the angle DT formed by adjacent elements of the conveyor chain 22 at the delivery turret 10, becomes the angle RT at the receiving turret 28, the article engaging fingers 90 pivot about their outside rollers 92 so that the upper end engaging the containers 14, rocks to the right and the lower end of the finger 90 connected to the inside roller 80, rocks to the left. In this manner, assuming that the guides 34 and 46 converge at a constant rate, then a uniform acceleration is imparted to the containers 14. It is known that if the velocity increases uniformly with time, then that motion is motion with constant acceleration, acceleration being defined as the time rate of change of velocity.

The conveyor system now operates with the articles being constantly accelerated from their point of entry to their point of departure and at a rate which accommodates a different spacing of the container as it is delivered than the spacing as it is removed. During operation of the system, a number of adjustments may be performed which compensate for chain-wear, etc., and without disturbing other parameters of the system. For example, the synchronism or timing of the conveyor chain 22 with the delivery turret 10 may be adjusted through the adjustment of the sprocket assembly 68 of the FIGURE 1. This adjustment does not alter the synchronism or adjustment between the conveyor chain 22 and the receiving turret 28 which may be modified by rotation of the screw 122, which is anchored to the bracket 124 (FIGURES 1 and 5) and in engagement with the short section of guide 50. In addition, the adjustable sprocket assembly 64 provides a further adjustment to compensate for wear of the parts.

Thus, the present invention may be embodied in other specific forms without departing from the spirit and the essential characteristics of the invention. The present embodiment is, therefore, to be considered in all respects as illustrative and the scope of the invention being indicated by the appended claims rather than the foregoing description, and all changes which come within the meaning and range of the equivalency of the claims are, therefore, intended to be embraced therein.

What is claimed is:

1. Article conveying means comprising a channel having converging side walls, and article conveying means positioned within said channel, said means comprising a plurality of interconnected elements each of which includes a first anti-friction means and a second anti-friction means restrained by and adapted to follow the side walls of said channel, one anti-friction means per wall, an article engaging finger connecting said first and second anti-friction means and extending beyond one of said walls, an intermediate link joining each of said elements to the adjacent element, and means for advancing said article conveying means in said channel to convey articles therealong and to smoothly accelerate said articles in accordance with the angle of convergence of said converging side walls.

2. Article conveying apparatus comprising a channel having converging side walls, and article conveying means positioned within said channel, said means comprising a plurality of interconnected elements each of which includes a pair of rollers positioned within said channel and engaging said walls, one roller per wall, an article engaging finger connecting said rollers and extending beyond one of said walls, an intermediate link for joining each of said elements to the adjacent element, and means for advancing said article conveying means in said channel to convey articles therealong and to smoothly accelerate said articles in accordance with the angle of convergence of said convergence side walls.

3. Article conveying apparatus comprising a channel having converging side walls, and article conveying means positioned within said channel, said means comprising a plurality of interconnected elements each of which includes a pair of rollers positioned within said channel and engaging said walls, one roller per wall, an article engaging finger connecting said rollers and extending beyond one of said walls, an intermediate link for joining each of said elements, and means for advancing said article conveying means in said channel to convey articles therealong and to smoothly accelerate said articles in accordance with the angle of convergence of said converging side walls by altering the position of said fingers with respect to said channel due to the motion imparted to said rollers by the converging side walls of said channel.

4. Article conveying apparatus comprising a converging channel, a first rotary means positioned at one end of said channel and a second rotary means positioned at the other end of said channel, and a conveyor chain positioned within said channel and about each of said rotary means, said chain comprising a plurality of interconnected elements each of which includes a pair of rollers positioned on opposite sides of said channel, an article engaging finger connecting said rollers and extending beyond said channel to engage articles, an intermediate link for joining each of said elements, means on said first and second rotary means for engaging said conveyor chain, and means for rotating one of said rotary means, thereby advancing said conveyor chain in said channel to convey articles therealong and to smoothly accelerate said articles in accordance with the angle of convergence of said converging side walls by altering the position of said fingers with respect to said channel due to the motion imparted to said rollers by the converging side walls of said channel.

5. Article conveying apparatus comprising a channel defined by a pair of converging side walls, a first sprocket positioned at one end of said channel, a second sprocket positioned at the other end of said channel, a conveyor chain positioned within said channel and about each of said sprockets, said chain comprising a plurality of interconnected elements each of which includes a pair of rollers positioned on opposite sides of said channel, an article engaging finger connecting said rollers and extending beyond said channel, an intermediate link for joining each of said elements, and means coupled to said sprockets for advancing said chain, thereby advancing said chain in said channel to convey articles therealong and to smoothly accelerate said articles in accordance with the angle of convergence of said converging side walls by altering the angular position of said fingers with respect to said channel due to the the motion imparted to said rollers in said channel by the converging side walls thereof.

6. The combination as defined in claim 5 wherein said conveyor chain is continuous.

7. Article conveying apparatus comprising a first turret having a first article capacity, a second turret having a second article capacity, a channel defined by a pair of converging side walls positioned between said turrets, a first sprocket juxtaposed said first turret, a second sprocket juxtaposed said second turret, a conveyor chain positioned within said channel and about each of said sprockets for receiving and delivering, respectively, articles from said first turret to said second turret, said chain comprising a plurality of interconnected elements each of which includes a pair of rollers positioned on opposite sides of said channel, an article engaging finger connecting said rollers and extending beyond said channel, and an intermediate link for joining each of said elements, and means for varying the convergence of the side walls of said channel to thereby alter the angular position of said fingers with respect to said channel to resutl in a varying of the acceleration imparted to the articles as they progress from said first turret to said second turret.

8. Article conveyor apparatus comprising a first turret having a first article capacity; means coupled to said first turret for varying the rotational speed of said turret; a second turret having a second article capacity; means coupled to said second turret for varying the rotational speed thereof; a channel defined by a pair of converging side walls positioned between said turret; a first sprocket juxtaposed said first turret; a second sprocket juxtaposed said second turret; a conveyor chain positioned within said channel and about each of said sprockets for receiving articles from said first turret and delivering articles to said second turret at a rate commensurate with the receiving of the articles, said chain comprising a plurality of interconnected elements each of which includes a pair of rollers positioned on opposite sides of said channel, an article engaging finger connecting said rollers and extending beyond said channel, and an intermediate link for joining each of said elements; and, means for varying the convergence of the side walls of said channel to thereby alter the angular position of said fingers with respect to said channel to result in a varying of the acceleration imparted to articles as they progress from said first turret to said second turret to thereby compensate for differences in the rotational velocity of said first and said second turret by their respective coupled means.

9. The combination as defined in claim 8 including means positioned along said channel for providing a fine adjustment of the pitch of the engaging fingers as said fingers deliver articles to said second turret.

10. The combination as defined in claim 8 including means coupled to said chain for maintaining a predetermined tension of said conveyor chain.

11. Article conveyor apparatus comprising a first turret having a first article capacity, means coupled to said first turret for varying the rotational speed of said turret; a second turret having a second article capacity, means coupled to said second turret for varying the rotational speed thereof; a channel defined by a pair of converging side walls positioned between said turrets; a first sprocket juxtaposed said first turret, a second sprocket juxtaposed said second turret; a conveyor chain positioned within said channel and about each of said sprockets for receiving articles from said first turret and delivering articles to said second turret at a rate commensurate with the receiving of the articles, said chain comprising a plurality of interconnected elements each of which includes a pair of rollers positioned on opposite sides of said channel, an article engaging finger connecting said rollers and extending beyond said channel, and an intermediate link for joining each of said elements, means coupled to said chain for altering the synchronism between said engaging fingers and said delivery turret to thereby accommodate variations in the rate of delivery of articles by said turret to said conveyor chain; and, means for varying the convergence of the side walls of said channel to thereby alter the angular position of said fingers with respect to said channel to result in a varying of the acceleration imparted to articles as they progress from said first turret to said second turret to thereby compensate for differences in the rotational velocity of said first and said second turret by their respective coupled means.

12. Article conveyor apparatus comprising a first turret having a first article capacity; means coupled to said first turret for varying the rotational speed of said turret; a second turret having a second article capacity; means coupled to said second turret for varying the rotational speed thereof; a channel defined by a pair of converging side walls positioned between said turret; a first sprocket juxtaposed said first turret; a second sprocket remote from said second turret; a conveyor chain positioned within said channel and about each of said sprockets for receiving articles from said first turret and delivering articles to said second turret at a rate commensurate with the receiving of the articles, said chain comprising a plurality of interconnected elements each of which includes a pair of rollers positioned on opposite sides of said channel, an article engaging finger connecting said rollers and extending beyond said channel, and an intermediate link for joining each of said elements; means positioned intermediate said second turret and said second sprocket for altering the synchronism between said engaging fingers and said second turret to thereby accommodate variations in the rate of removal of articles by said second turret from said conveyor chain; and, means for varying the convergence of the side walls of said channel to thereby alter the angular position of said fingers with respect to said channel to result in a varying of the acceleration imparted to articles as they progress from said first turret to said second turret to thereby compensate for differences in the rotational velocity of said first and said second turret by their respective coupled means.

13. Article conveyor apparatus comprising a first turret having a first article capacity; means coupled to said first turret for varying the rotational speed of said turret; a second turret having a second article capacity; means coupled to said second turret for varying the rotational speed thereof; a channel defined by a pair of converging side walls positioned between said turret, a first sprocket juxtaposed said first turret; a second sprocket along said channel and removed from said second turret; a conveyor chain positioned within said channel and about each of said sprockets for receiving articles from said first turret and delivering articles to said second turret at a rate commensurate with the receiving of the article, said chain comprising a plurality of interconnected elements each of which includes a pair of rollers positioned on opposite sides of said channel, an article engaging finger connecting said rollers and extending beyond said channel, and an intermediate link for joining each of said elements; means coupled to said chain for altering the synchronism between said engaging fingers and said first turret, independent of the synchronism between said second turret and said engaging fingers, to thereby accommodate variations in the rate of delivery of articles by said turret to said conveyor chain; means positioned intermediate said second sprocket for altering the synchronism between said engaging fingers and said second turret, independent of the synchronism between said first turret and said engaging fingers, to thereby accommodate variations in the rate of removal of articles by said turret from said conveyor chain; and, means for varying the convergence of the side walls of said channel to thereby alter the angular position of said fingers with respect to said channel to result in a varying of the acceleration imparted to articles as they progress from said first turret to said second turret to thereby compensate for differences in the rotational velocity of said first and second turret by their respective coupled means.

14. The combination as defined in claim 13 including means positioned along said channel for adjusting the pitch of the engaging fingers as said fingers deliver articles to said second turret and means coupled to said chain for maintaining a predetermined tension on said conveyor chain.

15. Article conveying apparatus comprising a channel defined by a pair of converging side walls, a first sprocket positioned at one end of said channel, a second sprocket positioned at the other end of said channel; a continuous conveyor chain positioned within said channel and about each of said sprockets; said chain comprising a plurality of interconnected elements each of which includes a pair of rollers positioned on opposite sides but within said channel, an article enaging finger connecting said rollers and extending beyond said channel, and an intermediate link for joining each of said elements; a variable speed turret for delivering articles to said conveyor chain in the area of said first sprocket; and, means coupled to said chain for altering the synchronism between said engaging fingers and said delivery turret to thereby accommodate variations in the rate of delivery of articles by said turret to said conveyor chain.

16. Article conveying apparatus comprising a channel defined by a pair of converging side walls; a first sprocket positioned at one end of said channel; a second sprocket positioned at the other end of said channel; a continuous conveyor chain positioned within said channel and about each of said sprockets; said chain comprising a plurality of interconnected elements each of which includes a pair of rollers positioned on opposite sides but within said channel, an article engaging finger connecting said rollers and etxending beyond said channel, and an intermediate link for joining each of said elements; means for delivering articles to said chain in the area of said first sprocket; a turret positioned intermediate said first and said second sprockets for receiving articles from said chain; and, means positioned intermediate said turret and said second sprocket for altering the synchronism between said engaging fingers and said turret to thereby accommodate variations in the rate of removal of articles by said turret and said conveyor chain.

17. Article conveying apparatus comprising a channel defined by a pair of converging side walls; a first sprocket positioned at one end of said channel; a second sprocket positioned at the other end of said channel; a continuous conveyor chain positioned within said channel and about each of said sprockets; said chain comprising a plurality of interconnected elements each of which includes a pair of rollers positioned on opposite sides but within said channel, an article engaging finger connecting said rollers and extending beyond said channel, and an intermediate link for joining each of said elements; a variable speed delivery turret for delivering articles to said conveyor chain in the area of said first sprocket; means coupled to said chain for altering the synchronism between said engaging fingers and said delivery turret to thereby accommodate variations in the rate of delivery of articles by said turret to said conveyor chain; a receiving turret positioned intermediate said first and said second sprockets; and, means positioned intermediate said delivery turret and said second sprocket for altering the synchronism between said engaging fingers and said delivery turret to thereby accommodate variations in the rate of removal of articles by said receiving turret from said conveyor chain.

References Cited by the Examiner

UNITED STATES PATENTS 2,534,054  12/1950  Parkes _____ 198—110
2,780,342  2/1957  Good _____ 198—170

EVON C. BLUNK, *Primary Examiner.*

RICHARD E. AEGERTER, *Examiner.*